(12) United States Patent
Yoshida et al.

(10) Patent No.: US 7,743,049 B2
(45) Date of Patent: Jun. 22, 2010

(54) CONTENT DATA RETRIEVAL APPARATUS

(75) Inventors: Tadashi Yoshida, Osaka (JP); Hitoshi Araki, Osaka (JP); Yoshiteru Kawasaki, Osaka (JP); Masato Yuda, Osaka (JP); Kazuya Nomura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 217 days.

(21) Appl. No.: 11/665,663

(22) PCT Filed: Oct. 4, 2005

(86) PCT No.: PCT/JP2005/018353

§ 371 (c)(1),
(2), (4) Date: Apr. 18, 2007

(87) PCT Pub. No.: WO2006/048988

PCT Pub. Date: May 11, 2006

(65) Prior Publication Data

US 2008/0222128 A1 Sep. 11, 2008

(30) Foreign Application Priority Data

Nov. 4, 2004 (JP) ............................. 2004-320198

(51) Int. Cl.
G06F 7/00 (2006.01)
G06F 17/30 (2006.01)
A63H 5/00 (2006.01)
G04B 13/00 (2006.01)

(52) U.S. Cl. .......................... 707/713; 707/737; 84/609

(58) Field of Classification Search ...................... 707/1, 707/100, 373, 5
See application file for complete search history.

(56) References Cited

U.S. PATENT DOCUMENTS

2004/0003706 A1 1/2004 Tagawa et al.

FOREIGN PATENT DOCUMENTS

| JP | 11-161659 | 6/1999 |
|---|---|---|
| JP | 2001-022778 | 1/2001 |
| JP | 2001-134573 | 5/2001 |
| JP | 2003-016078 | 1/2003 |
| JP | 2004-086189 | 3/2004 |

OTHER PUBLICATIONS

European Search Report issued Nov. 11, 2009 in European Application No. 05790249.6.
Cornelia Tudorie: "Linguistic Values on Attribute Subdomains in Vague Database Querying", WSEAS Transactions on Systems, [Online] vol. 3, No. 2, Apr. 2004, pp. 646-650, XP002553241, ISSN:1109-2777, Retrieved from the Internet [retrieved on Oct. 28, 2009].
Cornelia Tudorie: "Vague Criteria in Relational Database Queries", The Annals of "Dunarea De Jos" University of Galati, [Online] 2003, pp. 43-49, XP002553242, ISSN: 1221-454X, Retrieved from the internet [retrieved on Oct. 28, 2009].

*Primary Examiner*—James Trujillo
*Assistant Examiner*—Amresh Singh
(74) *Attorney, Agent, or Firm*—Wenderoth, Lind & Ponack, L.L.P.

(57) ABSTRACT

The present invention provides a content data retrieval apparatus capable of appropriately narrowing down the range of search targets even in the case where a distribution of attribute values of a group of contents regarded as search targets is uneven.

The content data retrieval apparatus of the present invention includes: an impression value database which stores attribute values; a conversion table in which an impression value is associated with a search word range that is a range of the attribute values associated with a search word; a range modification unit which modifies a relative relationship between a distribution range of attribute values and a search word range by modifying the search word range read out from the conversion table; a receiving unit which receives an input of a search word; and a retrieval unit which retrieves content data corresponding to the search word received by the receiving unit, by searching the attribute values included in the search word range associated with the search word.

12 Claims, 12 Drawing Sheets

FIG. 4

Conversion table storage unit — 108

Impression word conversion table

| Impression word | Range of corresponding impression value (impression word range) |
|---|---|
| exhilarating | $(x+1.6)^2+(y-0.7)^2 < 2.25$ |
| exciting | $(x-0.5)^2+(y-1.5)^2 < 7.56$ |
| pop | $(x-0.4)^2+(y+0.2)^2 < 1.0$ |
| lonely | $(x-1.0)^2+(y+1.2)^2 < 1.56$ |
| healing | $(x-1.6)^2+(y+3.2)^2 < 1.0$ |
| uptempo | $(x+0.3)^2+(y-1.0)^2 < 1.56$ |
| relaxing | $(x-0.8)^2+(y+1.5)^2 < 3.06$ |
| ⋮ | ⋮ |

CONTENT DATA RETRIEVAL APPARATUS

TECHNICAL FIELD

The present invention relates to a content data retrieval apparatus which retrieves content data.

BACKGROUND ART

Presently, advances in network environments, such as the Internet, and in technology for compressing digital data has made it possible to obtain a large amount of content data such as music data and video data. Conventionally, using a search word indicating an attribute such as a characteristic and a property of the content has been used to retrieve content data desired by the user.

In the conventional system for retrieving content data using a search word, an attribute value indicating a content attribute is assigned to each content data. The search word is converted into information indicating the range of the attribute value associated with the search word. Then, pieces of content data specified by the attribute values included in the range of the attribute value are outputted as search results.

Such content data retrieving system as described above include a music retrieval system for retrieving music data using impression words (e.g. Japanese Laid-Open Patent Application No. 2004_-86189). An impression word is a qualitative word representing an impression on music content, e.g., "relaxing".

According to the music retrieval system, an impression value is an index value representing an impression of the music set in advance for each music data. Moreover, an impression word inputted as a search word is converted to indicate the range of the corresponding impression value. The respective music data specified by the impression values included in the range of the impression value are retrieved as search results.

The music retrieval system is applied, for example, to car navigation apparatuses and PC music playback software.

With the conventional music retrieval system using impression words, however, the range of the impression value associated with an impression word is determined in a fixed manner. Therefore, in the case where the distribution of the impression values of respective pieces of music regarded as search targets is uneven, music is searched out only in the case of conducting a search using a specific impression word.

For example, in the case where a search target is a group of music obtained as a result of conducting a search using a specific artist's name, the impressions of many pieces of music are similar. That is to say that the absolute positions, within a space where impression values are presented, of the impression values of the respective pieces of music are close to each other. Therefore, in the case of conducting a search using an impression word, numerous pieces of music are selected for a specific impression word whereas no music is retrieved for an impression word other than that specific impression word.

Although a given impression word is the same, the range of the impression word intended by the user differs, e.g., the impression word "relaxing" used for the music performed by a rock artist who sings intensive music differs from the impression word "relaxing" used for the music performed by a female artist who sings calm music. This is because the user subconsciously knows that the possible range of impression values of music differs depending on an artist or a genre of the music, and thus represents, with an impression word, an impression relatively perceived in a group of music performed by the artist. However, the conventional music retrieval system using impression words does not take this point into consideration.

Thus, with the conventional music retrieval system using impression words, when the distribution of the impression values of the respective pieces of music regarded as search targets is uneven, the search results vary as well. As a result, the search results which reflect the user's intention cannot be outputted. In other words, it is not possible to narrow down the range of search targets, which is expected by the user.

The present invention is conceived in view of the above problem, and an object of the present invention is to provide a content data retrieval apparatus which retrieves, using a search word, the content data associated with an attribute value indicating a content attribute, and which appropriately narrows down the range of search targets even in the case where the distribution of attribute values for a group of contents regarded as search targets is uneven.

SUMMARY OF THE INVENTION

In order to achieve the above-mentioned object, the content data retrieval apparatus of the present invention is a content data retrieval apparatus which retrieves, using a search word, content data associated with an attribute value indicating a content attribute. The apparatus includes: an attribute value storage unit which stores the attribute value; a conversion table in which a search word is associated with a search word range that is a range of attribute values associated with the search word; a modification unit which modifies a relative relationship between the search word range and a distribution range of the attribute values by modifying attribute values read from the attribute value storage unit or the search word range read from the conversion table, in accordance with the distribution of the attribute values associated with respective content data regarded as search targets; a receiving unit which receives an input of a search word; and a retrieval unit which retrieves the content data corresponding to the search word, by searching the attribute values included in the search word range which is received by the receiving unit and is associated with the search word, in the relative relationship modified by the modification unit.

Thus, the content data retrieval apparatus of the present invention can modify the relative relationship between a distribution range of attribute values and a range of search word according to the distribution of the attribute values of respective content data to be a search target. Moreover, it is possible to retrieve content data using an inputted search word in the modified relative relationship between the distribution range of attribute value and the range of search word. Therefore, it is thus possible to appropriately narrow down the range of the search target even in the case where the distribution of the attribute values of the respective content data regarded as search targets is uneven.

In the content data retrieval apparatus of the present invention, the modification unit modifies the search word range read from the conversion table by reducing the size of the search word range and by moving the reduced-size search word range, so that the range is included in the distribution range, and the retrieval unit retrieves the content data corresponding to the search word, by searching the attribute values included in the search word range that is associated with the search word received by the receiving unit and that is modified by the modification unit.

With either of the above-mentioned configurations, it is possible to modify the relative relationship between the distribution range of attribute value and the range of search word. That is to say, the range of search targets can be appropriately narrowed down.

Furthermore, the present invention can be realized as a method which includes, as steps, the characteristic components of the content data retrieval apparatus of the present invention, or as a program that includes such steps, or as a storage medium such as a CD-ROM in which the program is stored, and even as an integrated circuit. Such a program can be distributed via a transmitting media such as a communication network.

As is apparent from the above description, with the content data retrieval apparatus of the present invention, it is possible to modify the relative relationship between the distribution range of attribute value and the range of search word according to the distribution of the attribute values of the respective content data regarded as search targets. Thus, the range of the search target can be appropriately narrowed down.

For example, in the case where content data is music data and the data is associated with an impression value as an attribute value, it is possible to modify the relative relationship between the range of the impression word specified by the user and the distribution range of impression values. Thus, even in the case where the search targets are a group of music data obtained as a result of conducting a search using a specific condition and the distribution of impression values is uneven, it is possible to conduct a search that reflects an intention of the user performing music retrieval, and to obtain an adequate number of music retrieved.

In addition, with the content data retrieval apparatus of the present invention, it is possible not only to narrow down the range of search target, but also to conduct a search for further narrowing down the range of search targets, the number of which has already been narrowed down by another retrieval unit.

BRIEF DESCRIPTION OF DRAWINGS

FIG. 4 is a diagram showing an example of the data structure of an impression word conversion table stored in a conversion table storage unit.

NUMERICAL REFERENCES

Figure 1:
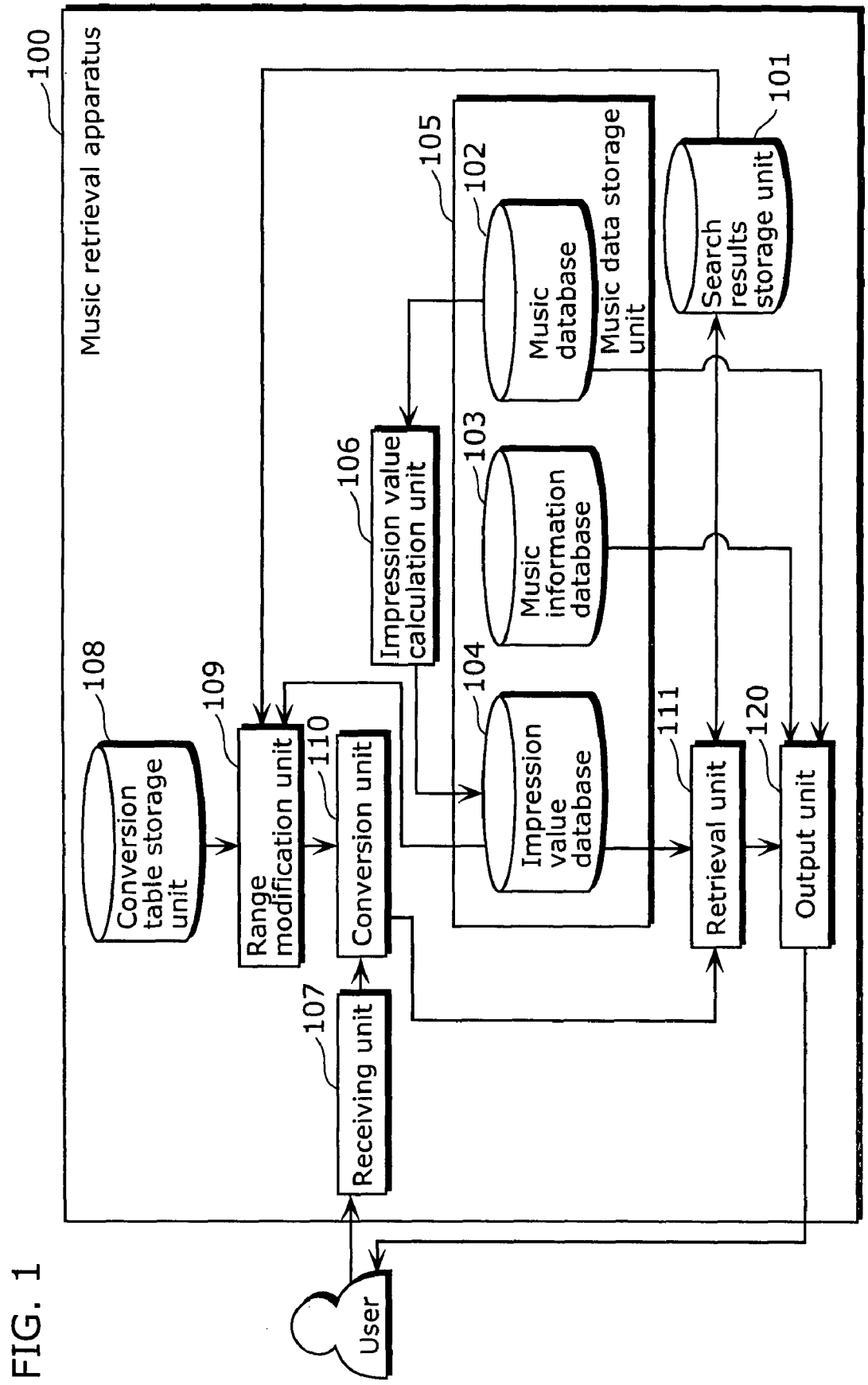
FIG. 1 is a block diagram showing the functional configuration of a music retrieval apparatus according to an embodiment of the present invention.

100 Music retrieval apparatus
101 Search results storage unit
102 Music database
103 Music information database
104 Impression value database
105 Music data storage unit
106 Impression value calculation unit
107 Receiving unit
108 Conversion table storage unit
109 Range modification unit
110 Conversion unit
111 Retrieval unit
112 Impression value modification unit
113 Output unit

DETAILED DESCRIPTION OF THE INVENTION

The following describes the embodiment of the present invention with reference to the Drawings.

First, the configuration of the music retrieval apparatus according to the embodiment of the present invention shall be described with reference to FIGS. 1 to 5.

FIG. 1 is a block diagram showing the functional configuration of a music retrieval apparatus 100 according to the embodiment of the present invention.

The music retrieval apparatus 100 shown in FIG. 1 is an example of the content data retrieval apparatus of the present invention, and is an apparatus which retrieves music data using an impression word specified as a search word by the user.

Note that the music retrieval apparatus 100 can be realized as an apparatus equipped with a music retrieval function, such as an audio device, a home server, an in-vehicle AV server, a music player for cell phones and a mobile terminal which can store a large amount of music data and playback the stored data. In addition, it is possible to realize the functional configuration of the music retrieval apparatus 100 as software and to implement it into a music playback application program intended for personal computers.

As shown in FIG. 1, the music retrieval apparatus 100 includes a search results storage unit 101, a music data storage unit 105, a receiving unit 107, a conversion table storage unit 108, a range modification unit 109, a conversion unit 110, a retrieval unit 111, an impression value calculation unit 106, and an output unit 120. The music data storage unit 105 includes a music database 102, a music information database 103 and an impression value database 104.

The search results storage unit 101 is a storage apparatus which stores information related to the results of the search conducted by the music retrieval apparatus 100. Note that, according to the embodiment, the information related to search results is information such as a music ID of the retrieved music data and an impression word being a search word used for the retrieval. Note that a music ID is an identifier for identifying respective pieces of music.

The music data storage unit 105 is a constituent unit that stores numerous pieces of music data, music information and impression values in association with one another. To be more specific, such music data, music information, and impression values are stored in the music database 102, the music information database 103 and the impression value database 104, respectively. The information and the data stored in the respective databases are associated by music IDs.

Note that the music data stored in the music database 102 is a music signal of a piece of music. Numerous music signals are stored in the music database 102. These music signals are each associated with a music ID, and a desired music signal is called out by specifying a music ID. In addition, such music signals are wave form data compliant with linear PCM or compressed data compliant with MP3, AAC or the like.

The music information stored in the music information database 103 is information related to music, such as artist's name, title of album, genre, year of release and name of composer. The music information of respective pieces of music is stored in association with a music ID.

An impression value stored in the impression value database 104 is calculated by the impression value calculation unit 106. Such impression value is stored in association with a music ID. The impression values stored in the impression value database 104 will be mentioned later with reference to FIG. 2. Note that an impression value is an example of an attribute value used in the content data retrieval apparatus of the present invention, and the impression value database 104 is an example of the attribute value storage unit in the content data retrieval apparatus of the present invention.

The receiving unit 107 is a processing unit which receives an impression word specified by the user. The impression words according to the embodiment are phrases representing impressions of music and words to intuitively express music, e.g., "uptempo" "pop" and "healing".

The conversion table storage unit 108 is a storage apparatus which stores an impression word conversion table in which an impression word is associated with information indicating a range of impression values (hereinafter to be referred to as "impression word range") associated with the impression word. The impression word conversion table will be described later with reference to FIG. 4.

The range modification unit 109 is a processing unit for solving the problems of the conventional music retrieval system using impression words, and is also a processing unit which obtains an impression word conversion table from the conversion table storage unit 108 and modifies the detail of the obtained impression word conversion table according to the distribution of the impression values of the respective pieces of music regarded as search targets.

A concrete method for the range modification unit 109 to modify the detail of the impression word conversion table read out from the conversion table storage unit 108 will be mentioned later with reference to FIGS. 4 and 5.

The conversion unit 110 is a processing unit which converts information indicating a range of the impression values (hereinafter to be referred to as "impression word range") associated with the impression word specified by the user, using the impression word conversion table modified by the range modification unit 109. Note that the impression word range is an example of the search word range applied in the content data retrieval apparatus of the present invention.

The retrieval unit 111 is a processing unit which retrieves multiple music data corresponding to an impression word specified by the user, by searching the impression values included in an impression word range. The output unit 120 is a processing unit for outputting, to the user, the results of the search conducted by the retrieval unit 111. Note that the search results outputted by the output unit 120 are presented to the user by a display apparatus not illustrated in the diagram.

The impression value calculation unit 106 is a processing unit which calculates an impression value of a piece of music based on the music data stored in the music database 102. Specifically, the impression value calculation unit 106 analyzes a physical feature quantity of the music signal inputted from the music database 102, and calculates an impression value to which the feature quantity is weighted.

The following is analyzed as such physical feature quantity: a spectrum change degree (a degree at which a spectrum changes between frames of predetermined time length); an average pronunciation frequency (a pronunciation frequency of a sound pronounced in music); an aperiodic degree of pronunciation (an aperiodic degree of a sound pronounced in music); a beat cycle (a time length equivalent to quarter note in music); a beat cycle ratio (a strength of a sound pronounced in a cycle equivalent to quarter note in music); and a beat strength ratio (a ratio of first beat strength and second beat strength).

The impression value calculation unit 106 performs predetermined weighting addition to the feature quantity obtained through the analysis so as to calculate an impression value. One or more types of impression values are calculated for one piece of music. Also, predetermined maximum value and minimum value which are possibly indicated by an impression value are set.

In the case where two types of impression values are provided, music can be represented as a dot in a two-dimensional space. In the case where five types of impression values are provided, music is represented as a dot in a five-dimensional space. In other words, each piece of the music stored in the music database 102 has coordinate values which reflect the respective impression values in such a space. It is therefore possible to discriminate one piece of the music stored in the music database 102 from another piece based on a pair of these impression values.

Here, an impression value is an index value presenting an impression such as sensation and emotion that arises when one listens to the music, e.g. intensiveness, dynamism, exhilaration, simplicity and softness. Impression values can be thus expressed as linear or non-linear function presenting feature quantities of plural types as described above. For example, with the use of five types of impression values such as intensiveness, dynamism, exhilaration, simplicity and softness, music is represented by a dot in a five-dimensional space.

Moreover, intensiveness and dynamism are combined to form an active factor, while exhilaration, simplicity and softness are combined to form an emotional factor. In this way, by grouping the five types of impression values into the two impression values of an active factor and an emotional factor, music is represented as a dot in a two-dimensional space. Such a spatial coordinate system in which impression values of music are distributed is hereinafter referred to as "impression space". An impression value is a quantity which indicates an impression that one receives in listening to the music. Therefore, when the impression values of respective pieces of music are placed in an impression space, the impression values are placed in accordance with similarity between the impressions on the respective music. That is to say that the plural pieces of music giving similar impressions are placed in the positions close to each other even in the impression space.

Note that two types of impression values are used in the present embodiment: an impression value X being an impression value based on the emotional factor; and an impression value Y being an impression value based on the active factor.

Figure 2:
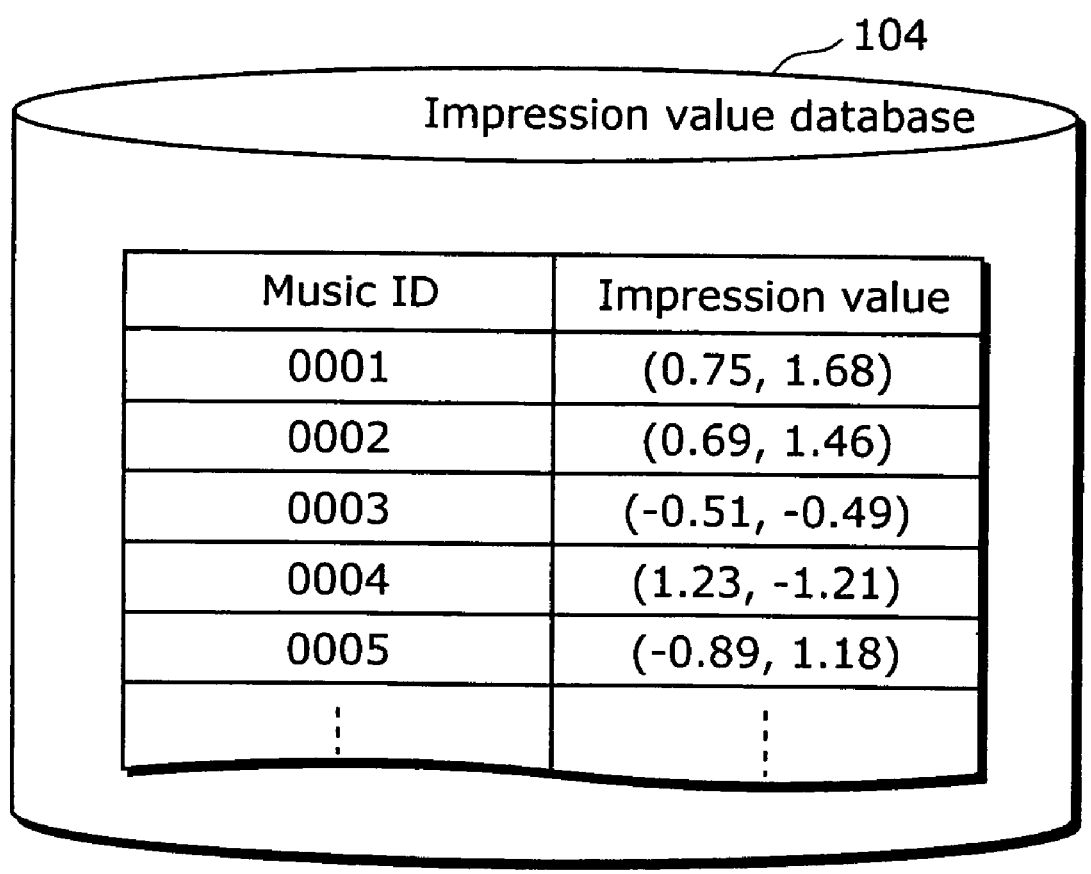
FIG. 2 is a diagram showing an example of impression value data stored in an impression value database.

FIG. 2 is a diagram showing an example of the impression value data stored in the impression value database 104.

As shown in FIG. 2, two impression values are associated with each other for each music ID, and a pair of the two impression values can be handled as a coordinate value indicating one dot in a two-dimensional space. In other words, a coordinate value of a given music can be treated as an index indicating an impression of the music, for instance, "dynamic and exhilarating". Therefore, a coordinate value made up of one or more impression values is also regarded as an "impression value" of the music.

Figure 3:
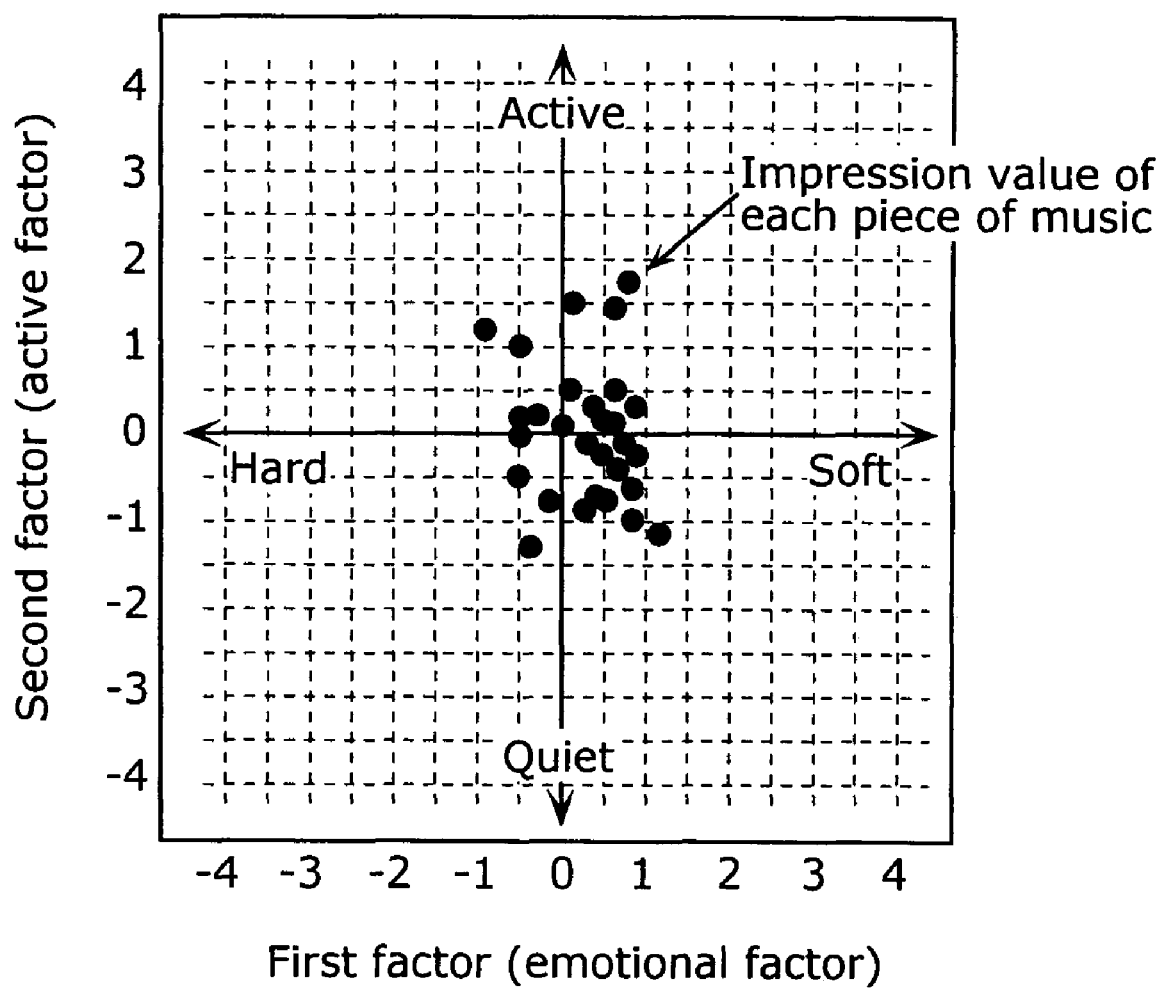
FIG. 3 is a conceptual diagram showing an example of an impression space according to the embodiment of the present invention.

FIG. 3 is a conceptual diagram showing an example of the impression space according to the embodiment. The impression space of the embodiment is, as described above, two-dimensional and the more right a coordinate value is located, more "Soft" an impression of a piece of music is and the more left a coordinate value is located, more "Hard" an impression of a piece of music is. Similarly, the upper a coordinate value is located, more "Active" an impression of a piece of music is and the lower a coordinate value is located, more "Quiet" an impression of a piece of music is.

The two-dimensional impression space has a predetermined size. In the embodiment, both of a horizontal direction (X-axis direction) and a vertical direction (Y-axis direction) are ranged from −4 to +4, as shown in FIG. 3. That is to say, the smallest values of the impression values X and Y are −4 while the largest values thereof are +4.

Moreover, the respective dots in the impression space shown in FIG. 3 correspond to one piece of music except for the case where there exist plural pieces of music having the same impression values. Here, the dots in the impression space shown in FIG. 3 are lopsidedly inclined toward the center. In other words, it can be said that the impressions of many pieces of the music indicated by the dots within the impression space are similar.

In the music retrieval apparatus 100 according to the embodiment, the range modification unit 109 modifies, as described above, the detail of the impression word conversion table obtained from the conversion table storage unit 108, according to the distribution of the impression values within an impression space.

FIG. 4 is a diagram showing an example of the data structure of the impression word conversion table stored in the conversion table storage unit 108. An impression word conversion table is a table for converting an impression word specified as a search word by the user into information indicating an impression word range.

As shown in FIG. 4, the impression words such as "exhilarating" and "pop" are set in the impression word conversion table. The user can specify an impression word to be used as a search word from among the impression words already set in the impression word conversion table, using an input apparatus (not illustrated in FIG. 1) such as a mouse.

Also, an equation which expresses a circle within the impression space is defined as information indicating the range of the impression value associated with each impression word.

For example, in the case where an impression word is "pop", the impression word range is expressed by an equation (Equation 1) which indicates the inner range of the circle whose radius is 1 with (X, Y)=(0.4, −0.2) in the center, as shown in FIG. 4.

$$(X-0.4)^2+(Y+0.2)^2<1 \quad \text{(Equation 1)}$$

In other words, the impression word range is a range that is within the impression space and that satisfies the corresponding equation that is set in the impression word conversion table.

The range modification unit 109 according to the embodiment obtains the impression word conversion table shown in FIG. 4 from the conversion table storage unit 108, and modifies the detail of the table based on the method indicated below.

For example, assuming that the range of the impression values of the respective pieces of music regarded as search targets is (−0.9<x<1.3), (−1.6<y<1.7) and the receiving unit 107 receives an impression word "pop". Also, the range of the impression space is set as (−4<x<4), (−4<y<4).

Under such an assumption, linear mapping function to perform linear mapping from a point (X, Y) within the impression space to a range (x,y) of the impression values of the respective pieces of music regarded as search targets is expressed by the following equations (Equation 2) and (Equation 3).

$$x = \frac{2.2}{8}X + 0.2 \quad \text{(Equation 2)}$$

$$y = \frac{3.3}{8}Y + 0.05 \quad \text{(Equation 3)}$$

Here, the inner range (Equation 1) of the circle whose radius is 1 with (0.4, −0.2) in the center which is the impression word range corresponding to the impression word "pop" is converted to the inner range of an ellipse as represented by the equation (Equation 4), using the mapping function.

$$\frac{(x-0.31)^2}{\left(\frac{2.2}{8}\right)^2} + \frac{(y+0.0325)^2}{\left(\frac{3.3}{8}\right)^2} < 1 \quad \text{(Equation 4)}$$

Thus, the range modification unit 109 makes modification to each impression word range read out from the conversion table storage unit 108 in accordance with the distribution of impression values. In addition, the range modification unit 109 passes, to the conversion unit 110, the impression conversion table to which modification has been made.

The conversion unit 110 converts the impression word specified by the user and received by the receiving unit 107 into information indicating an impression word range. The impression word conversion table modified by the range modification unit 109 using the above-mentioned method is referred to for the conversion. The impression word range information obtained through the conversion is sent to the retrieval unit 111. That is to say that, in the embodiment, the modified equation as exemplified by the equation (Equation 4) is sent to the retrieval unit 111.

Accordingly, the retrieval unit 111 retrieves the music data that fall within the impression word range modified by the range modification unit 109, but not the impression word range that is previously set in the impression word conversion table.

Figure 5:
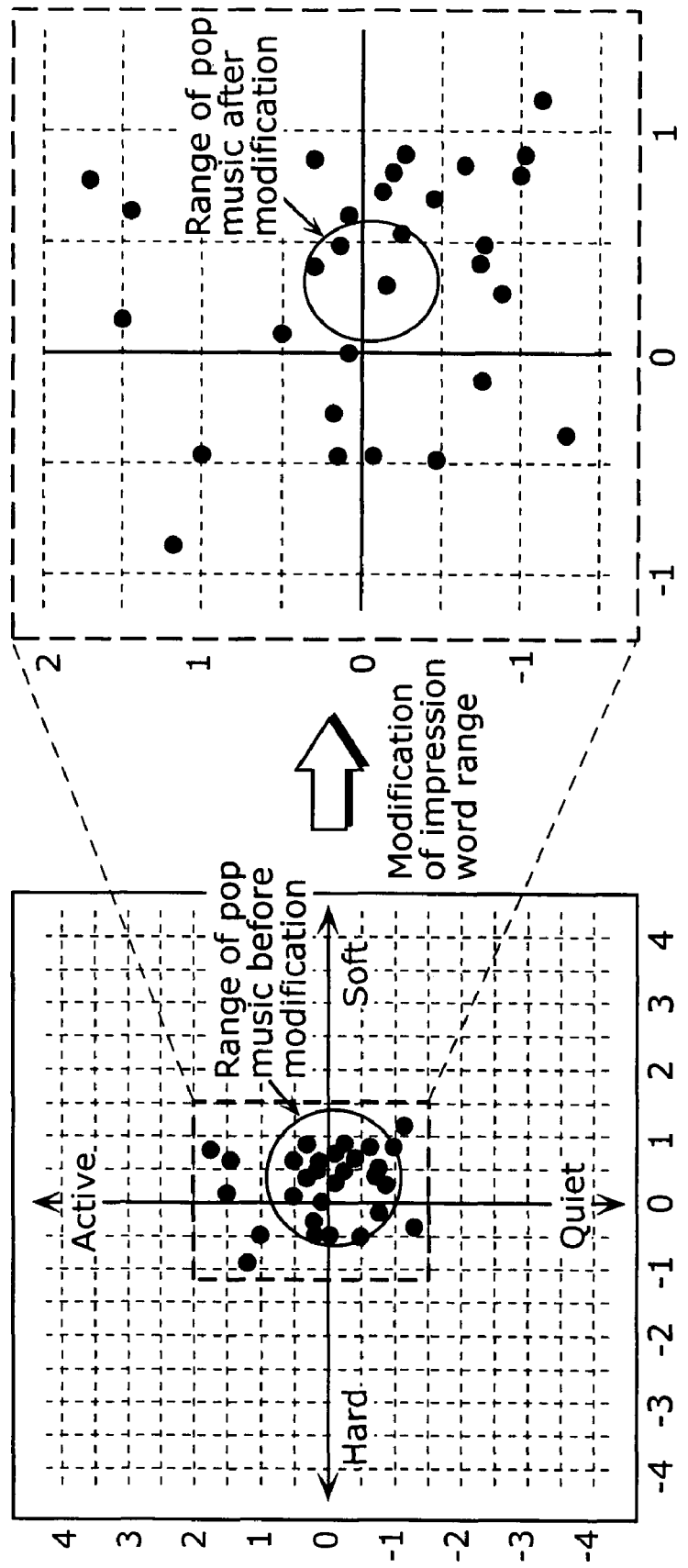
FIG. 5 is a conceptual diagram showing an example of modification in the range of impression values made by a range modification unit.

FIG. 5 is a conceptual diagram showing an example of the modification made by the range modification unit 109 to a range of impression values.

The graph in the left of FIG. 5 indicates an impression word range within the impression space for the impression word "pop" before modification, whereas the graph in the right indicates an impression word range within the impression space for the impression word "pop" after modification.

Assuming the case of searching the impression word range before modification, a majority of the music regarded as search targets turn out to be "pop", as shown in FIG. 5, and it is not possible to provide the user with the effect of narrowing down the number of search targets through a search. However, with the modification of the impression word range by the range modification unit 109, the number of music that fall within the range for the impression word "pop" is reduced to an appropriate number.

With the above-mentioned configuration, music data retrieval is performed using an impression word specified by the user, and the user is provided, via the output unit 120, with music IDs, music information and music data of the respective pieces of music searched out using the impression word, as search results. Moreover, the information regarding the search results such as music IDs and impression words used as search words is stored into the search results storage unit 101 as described above. In the case of further narrowing down the number of search results, the next search is performed using the information thus stored in the search results storage unit 101.

Next, a flow of the processes performed by the music retrieval apparatus 100 according to the embodiment of the present invention will be described below.

Figure 6:
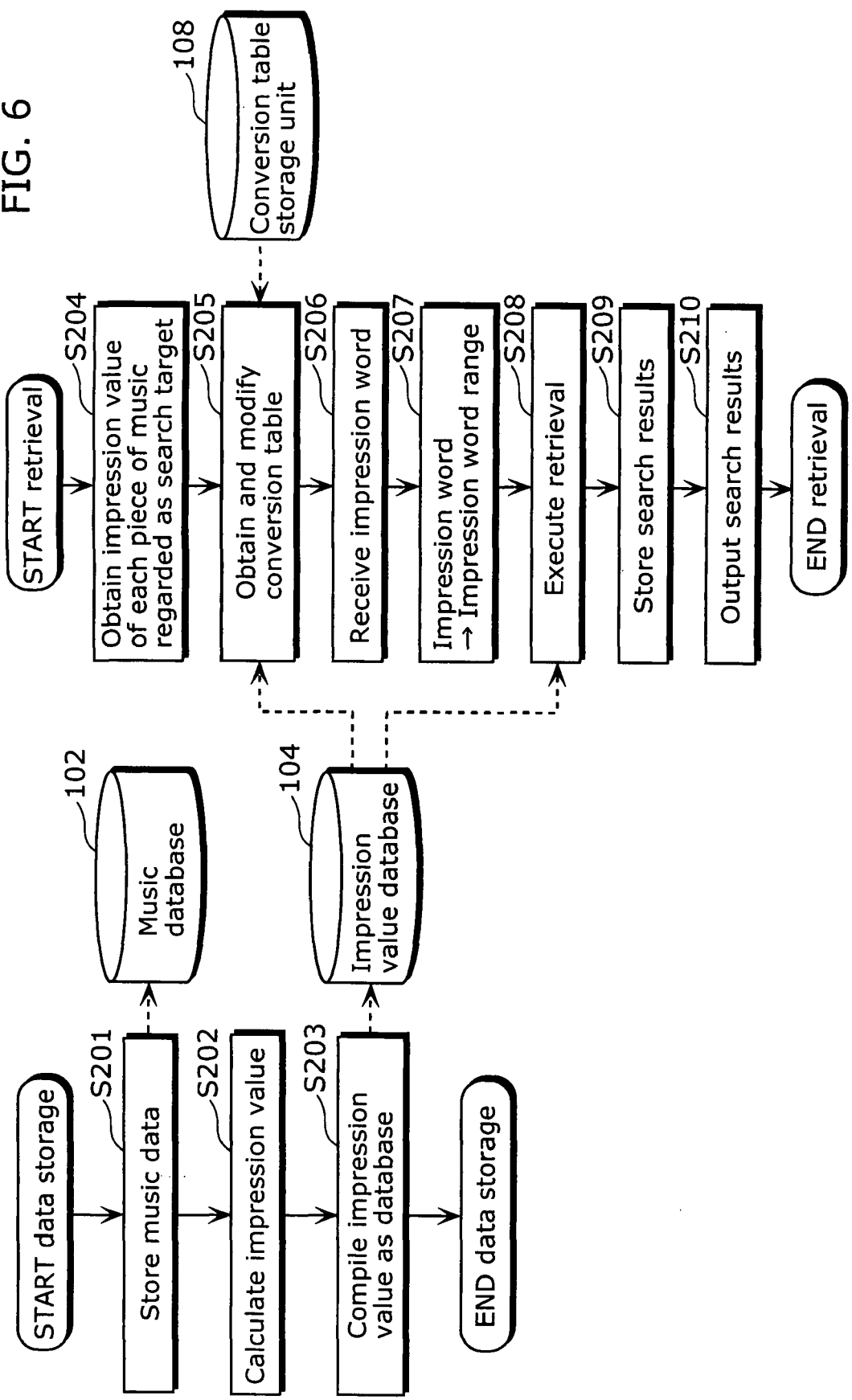
FIG. 6 is a flowchart showing an example of a flow of the processes performed by the music retrieval apparatus according to the embodiment of the present invention.

FIG. 6 is a flowchart showing an example of the flow of the processes performed by the music retrieval apparatus 100 according to the embodiment of the present invention. Here, the processes performed by the music retrieval apparatus 100 can be divided into two kinds of processes: the processes (S201-S203) related to the creation of the impression value database 104 necessary for music data retrieval; and the processes (S204-S210) related to the execution of the music data retrieval.

First, the processes (S201-S203) related to the creation of the impression value database 104 required for music data retrieval shall be described. The processes only need to be executed before music data retrieval is performed.

First of all, music data is stored in the music database 102 by a predetermined unit (S201). Each of the stored music data is attached with a single music ID. The impression value calculation unit 106 calculates an impression value for each of the stored music data (S202). Specifically, the impression value calculation unit 106 analyzes a music signal of the music data stored, calculates a feature quantity of the music, as described above. The impression value calculation unit 106 then calculates an impression value by performing weighting addition to the calculated feature quantity. Lastly, the impression calculation unit 106 stores, in the impression value database 104, the calculated impression value in association with the music ID of the music data based on which the calculation is performed (S203).

With the above processes, the music database 102 and the impression value database 104 which are necessary for performing music data retrieval using impression values are generated. The music information database 103 is also created as needed when storing music data.

Next, the processes (S204-S210) related to the execution of music data retrieval shall be described. Such processing is started by a user's predetermined operation as a trigger.

First, the conversion unit 110 obtains an impression value of each of the pieces of music regarded as search targets (S204). To be more concrete, in the case of conducting a search for narrowing down the number of search results obtained through the previous search, the conversion unit 110 obtains the music IDs of the music data that are searched out through the previous search. Furthermore, the conversion unit 110 reads out, from the impression value database 104, the impression values associated with the respective music IDs obtained.

In the case of setting all the music data stored in the music database 102 as search targets, the conversion unit 110 obtains all the impression values and the music IDs stored in the impression value database 104.

Whether the search targets are a group of music data obtained as a result of conducting a previous search or whether the search targets are all pieces of music is judged based on a user's predetermined operation. This judgment is made upon the reception of the user's predetermined operation by the receiving unit 107, and then the result of the judgment may be notified to the range modification unit 109 via the conversion unit 110.

The range modification unit 109 reads out an impression word conversion table from the conversion table storage unit 108, and modifies the read-out impression word conversion table in accordance with the distribution of the impression values of the respective pieces of music regarded as search targets (S205). The method of modification is as described above, and an equation that is set in the impression word conversion table is modified according to the distribution of the impression values.

The receiving unit 107 receives the impression word specified by the user (S206). The conversion unit 110 converts the impression word obtained by the receiving unit 107 into an equation that indicates an impression word range, using the impression word conversion table modified by the range modification unit 109 (S207).

The retrieval unit 111 conducts a search based on the music IDs of the respective pieces of music regarded as search targets and the equation indicating an impression word range (S208). Specifically, the retrieval unit 111 receives, via the conversion unit 110, the music IDs of the multiple number of music regarded as search targets. Note that in the case where the search target is a group of music searched out through the previous search, the retrieval unit 111 may obtain a device ID from the search results storage unit 101.

The retrieval unit 111 receives an equation indicating an impression word range from the conversion unit 110. The retrieval unit 111 reads out, from the impression value 104, the impression values associated with the received music IDs, and retrieves the impression values which fall within the impression word range indicated by the equation, from among the read-out impression values.

The retrieval unit 111 stores, into the search results storage unit 101, information such as the pieces of music retrieved in the search, that is, the respective music IDs associated with the impression values located within the impression word range (S209).

The retrieval unit 111 notifies the output unit 120 of the music IDs of the respective pieces of the retrieved music. The output unit 120 reads out, when necessary, the music information and music data associated with the notified music IDs respectively from the music information database 103 and the music database 102, and outputs them to the user (S210).

Here, the difference between the search results obtained in the case of conducting a search, by impression word using the conventional music retrieval system, with respect to a group of music data obtained as a result of conducting a search using a specific singer's name, and the search results obtained in the case of conducting a search in the same way using the music retrieval apparatus 100 of the embodiment will be described.

Figure 7:
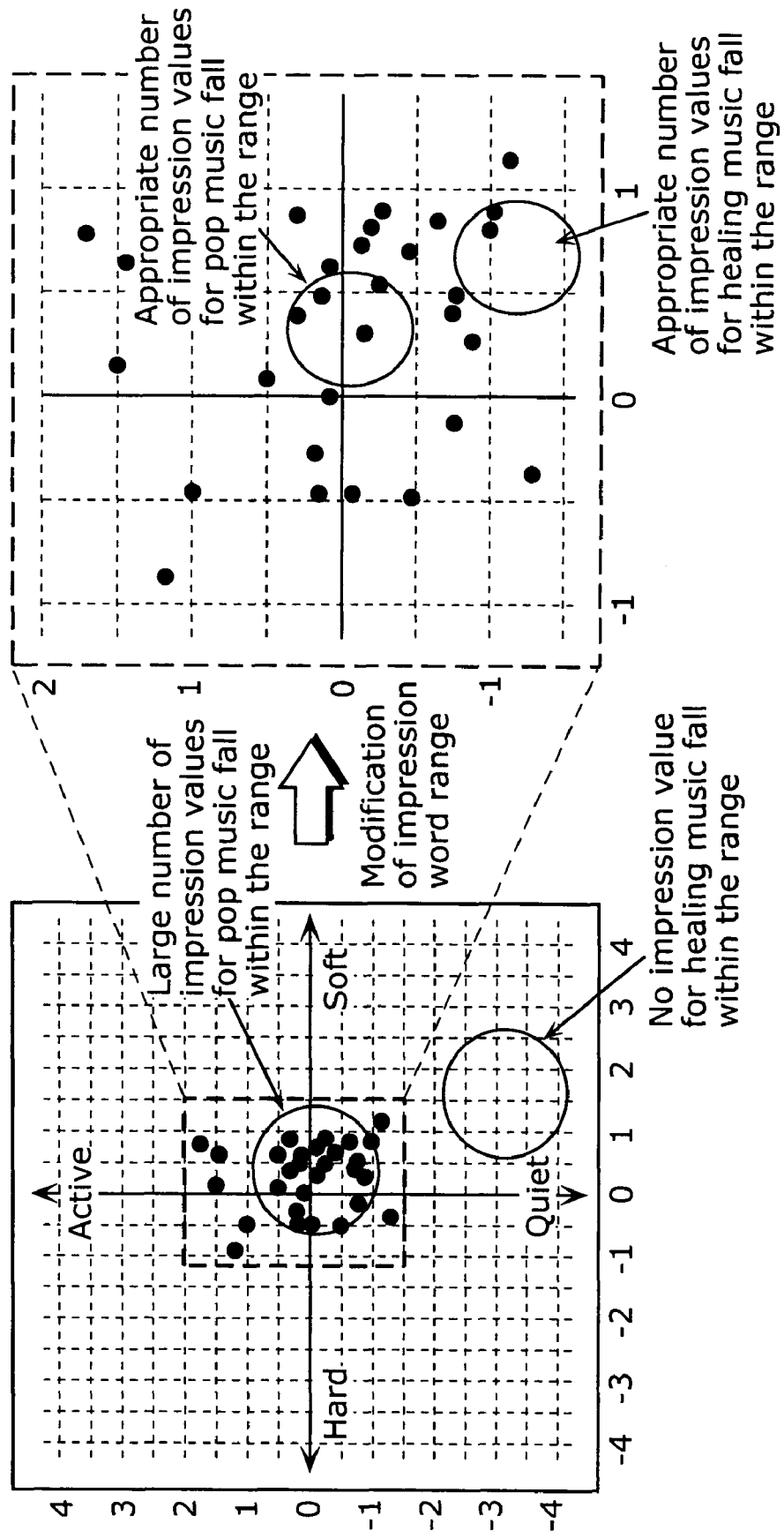
FIG. 7 is a conceptual diagram of impression spaces showing a difference between search results obtained in the conventional music retrieval system and search results obtained in the music retrieval apparatus according to the embodiment.

FIG. 7 is a conceptual diagram showing impression spaces showing the difference between the search results obtained by the conventional music retrieval system and the search results obtained by the music retrieval apparatus 100 of the embodiment.

The graph in the left of FIG. 7 shows the search results obtained by the conventional music retrieval system and the graph in the right shows the search results obtained by the music retrieval apparatus 100 of the embodiment.

The pieces of music regarded as search targets are the pieces of music performed by a specific singer, and the distribution of impression values is lopsidedly inclined to the center of the impression space. Therefore, in the case of conducting a search using the conventional music retrieval system, the search results in that a large number of music fall within the impression word range for the impression word "pop" while no music fall within the impression word range for the impression word "healing".

In contrast, with the music retrieval apparatus 100 of the embodiment, an impression word range is modified according to the distribution of impression words, as described above. In other words, an impression word range is modified by performing linear mapping to the impression word range, from an impression value space to the distribution range of impression values. Therefore, an adequate number of music fall within the impression word ranges for the impression words "pop" and "healing" equally, as shown in the right of FIG. 7.

As described above, with the music retrieval apparatus 100 according to the embodiment of the present invention, even in the case where the distribution of impression values representing a group of music regarded as search targets is not even, a search can be conducted using impression words in the relative relationship, which is obtained by modifying the distribution of such impression values, between the distribution range of impression values and the search word range. Thus, it is possible to output an adequate number of search results no matter which impression word is selected as a search word.

Note that, in the music retrieval apparatus 100 of the embodiment described above, it is assumed that the range modification unit 109 modifies, through mapping, an impression word range within an impression space so that the impression word range is fitted to the distribution range of the impression values of a group of music regarded as search targets.

However, impression values may be modified using inverse mapping so that the distribution range of impression values disperses on the entire impression space. In other words, in order to modify a relative positional relationship between the distribution range of impression values and the impression word range according to the distribution of impression values, the distribution range of impression values may be modified.

Figure 8:
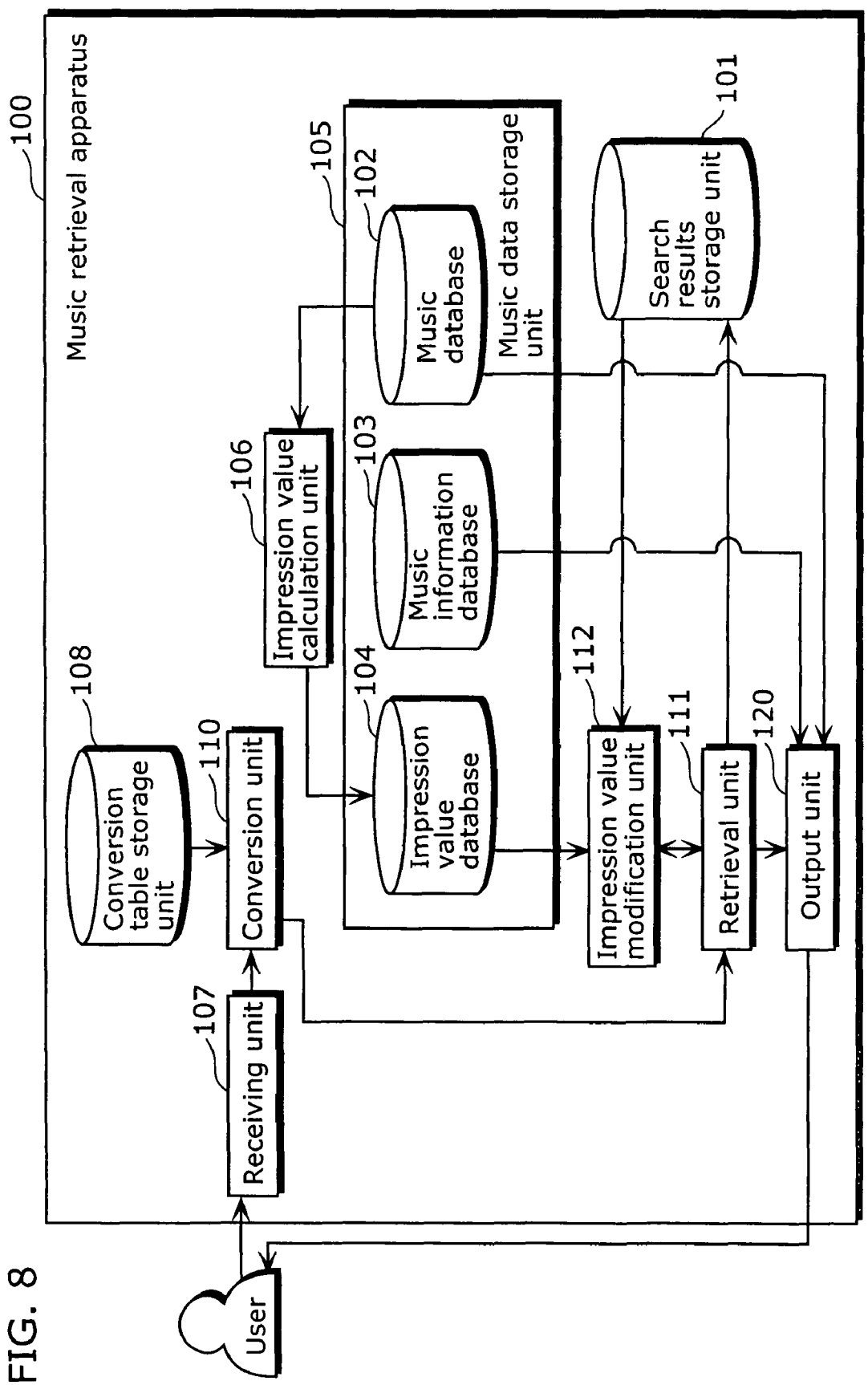
FIG. 8 is a functional block diagram showing the functional configuration of the music retrieval apparatus equipped with an impression value modification unit.

FIG. 8 is a block diagram showing the functional configuration of the music retrieval apparatus 100 equipped with an impression value modification unit 112.

The music retrieval apparatus 100 shown in FIG. 8 produces the same effect as achieved by the music retrieval apparatus 100 of the embodiment described above. In other words, even in the case where the distribution of the impression values of the respective pieces of music regarded as search targets is not even, it is possible to appropriately narrow down the search target. However, the music retrieval apparatus 100 in FIG. 8 is equipped with the impression value modification unit 112 which modifies the distribution range of impression values within an impression space, which is different from the music retrieval apparatus 100 of the embodiment described above. The impression value modification unit 112 is another example of the modification unit in the content data retrieval apparatus of the present invention.

Specifically, the impression values of the respective pieces of music regarded as search targets are modified by inverse mapping conversion which is inverse conversion of the mapping conversion as expressed by the above-mentioned equations (Equation 2) and (Equation 3). The equations (Equation 5) and (Equation 6) are inverse mapping conversion function of the equations (Equation 2) and (Equation 3). Namely, the equations (Equation 5) and (Equation 6) are functions representing linear mapping from a distribution range of impression values to an impression value space.

$$X = \frac{2.2}{8}(x - 0.2) \qquad \text{(Equation 5)}$$

$$Y = \frac{3.3}{8}(y - 0.05) \qquad \text{(Equation 6)}$$

The impression value modification unit 112 uses the equations (Equation 5) and (Equation 6), and modifies the impression value (x,y)=(1.3,−1.6) into (X,Y)=(4.0,−4.0). Thus, the impression value modification unit 112 can make modification to the impression values in accordance with the distribution of impression values.

Figure 9:
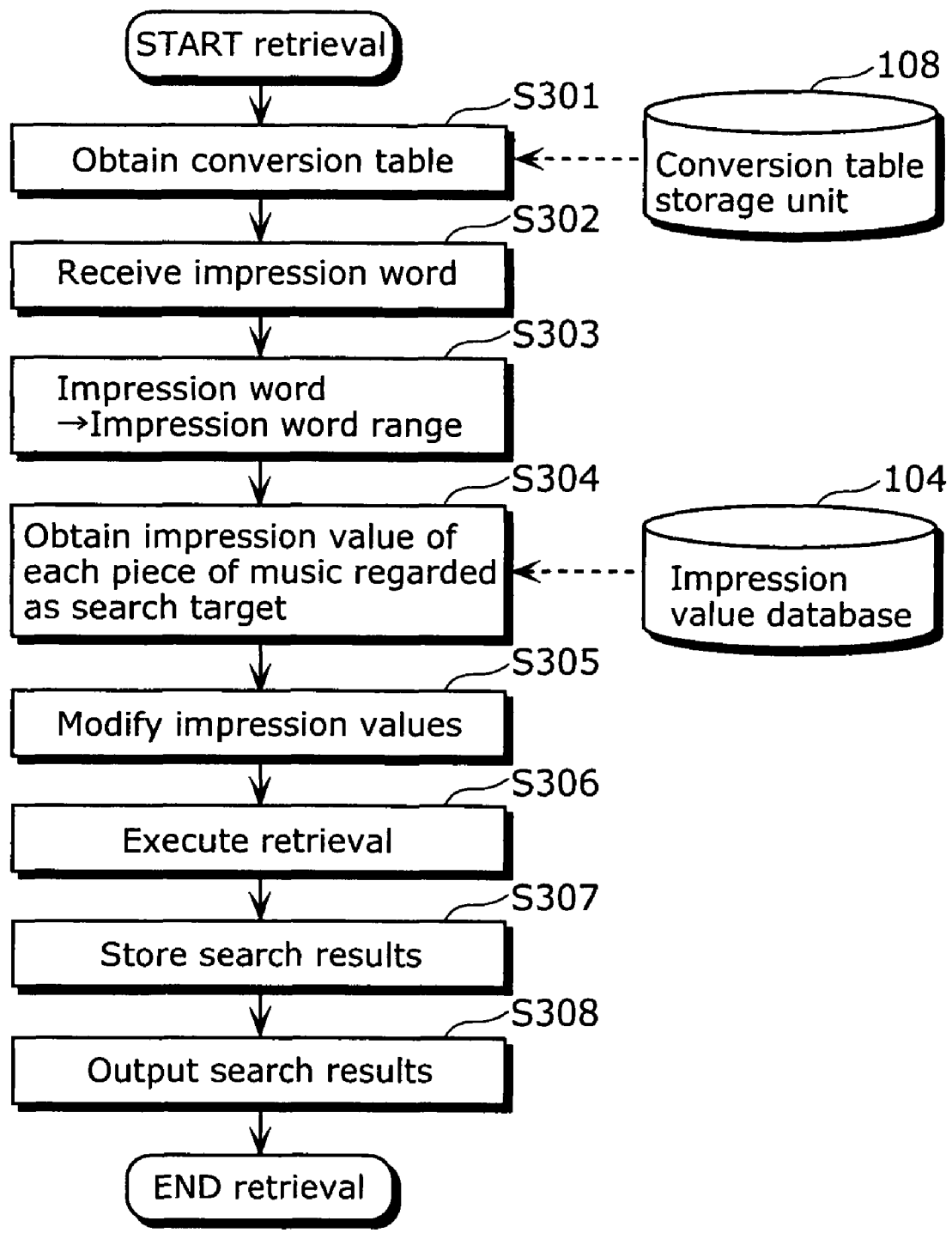
FIG. 9 is a diagram showing an example of a flow of the processes performed by the music retrieval apparatus equipped with an impression value modification unit.

FIG. 9 is a diagram showing an example of the flow of the processes performed by the music retrieval apparatus 100 equipped with the impression value modification unit 112.

Note that the processes related to the creation of the impression value database 104 required for music data retrieval are as same as the processes (S201-S203) shown in FIG. 3, and the illustration and description thereof are omitted.

The processes related to the execution of music data retrieval performed by the music retrieval apparatus 100 shown in FIG. 8 is described with reference to FIG. 9. These processes are started by a user's predetermined operation as a trigger.

First, the conversion unit 110 reads out an impression word conversion table from the conversion table storage unit 108 (S301). The receiving unit 107 receives an impression word specified by the user (S302). The conversion unit 110 converts the impression word obtained by the receiving unit 107 into an equation expressing an impression word range, using the impression word conversion table read out from the conversion table storage unit 108 (S303).

The impression value modification unit 112 obtains an impression value of each of the pieces of music regarded as search targets. (S304). Specifically, in the case of conducting a search for narrowing down the number of search results obtained through the previous search, the impression value modification unit 112 obtains the music IDs of the respective pieces of music searched out in the previous search, and then reads out the impression values associated with the obtained music IDs from the impression value database 104.

In the case of setting all the music data stored in the music database 102 as search targets, the impression value modification unit 112 obtains the music IDs of all the impression values stored in the impression value database 104.

Whether the search targets are a group of music data obtained as a result of conducting a previous search or whether the search targets are all pieces of music is judged based on a user's predetermined operation. This judgment is made upon the reception of the user's predetermined operation by the receiving unit 107, and then the result of the judgment may be notified to the impression value modification unit 112 via the conversion unit 110 and the retrieval unit 111.

The impression value modification unit 112 modifies the impression values of the respective pieces of music regarded as search targets, using the above equations (Equation 5) and (Equation 6).

The retrieval unit 111 conducts a search based on the music IDs of the respective pieces of music regarded as search targets and the equation representing an impression word range (S306). Specifically, the retrieval unit 111 receives the music IDs of the respective pieces of music regarded as search targets and the modified impression values from the impression value modification unit 112, as well as the equation representing an impression word range from the conversion unit 110. The retrieval unit 111 retrieves the impression values that are within the impression value range represented by the equation, from among the received impression values.

The retrieval unit 111 causes the search results storage unit 101 to store information such as pieces of the music retrieved in the search, that is, the music IDs associated with the impression values located within the impression word range (S307).

In addition, the retrieval unit 111 notifies the output unit 120 of the music IDs of the respective pieces of the music retrieved. The output unit 120 reads out the music information and music data associated with each of the notified music IDs into the music information database 103 and the music database 102 respectively, and outputs them to the user (S308).

With the above-mentioned processes, the music retrieval apparatus 100 equipped with the impression value modification unit 112 can appropriately narrow down the range of search target.

Figure 10:
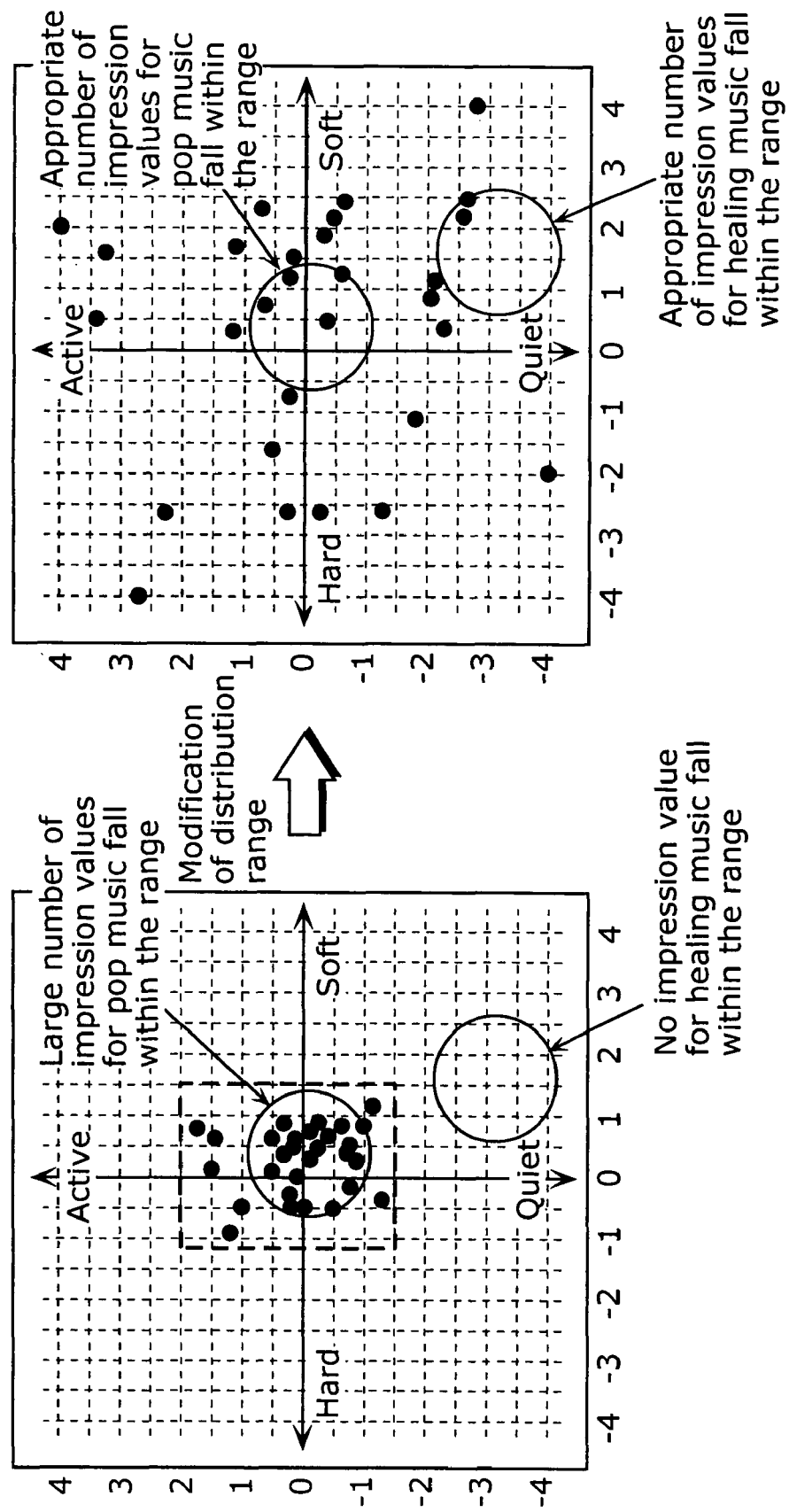
FIG. 10 is a conceptual diagram of impression spaces showing a difference between search results obtained in the case of not modifying the distribution range of impression values, and search results obtained in the case of modifying the distribution range of impression values according to the flow of the processes shown in FIG. 9.

FIG. 10 is a conceptual diagram of impression spaces showing a difference between the search results obtained in the case of not modifying the distribution range of impression values and the search results obtained in the case of modifying the distribution range of impression values according to the flow of the processes shown in FIG. 9.

Assuming that the pieces of music regarded as search targets are a group of music obtained as a result of conducting a search using a specific singer's name, as is the case described with reference to FIG. 7.

In this case, as shown in the left of FIG. 7, the distribution of impression values is lopsidedly inclined to the center of the impression space. Therefore, in the case of searching a conduct using the conventional music retrieval system, the search results in that a large number of music fall within the impression word range for the impression word "pop" while no music fall within the impression word range for the impression word "healing". This is the processing performed in the conventional music retrieval system.

In contrast, the music retrieval apparatus 100 equipped with the impression value modification unit 112 modifies the distribution range of impression values. More specifically, the impression values are modified through a conversion by linear mapping from a distribution range of impression vales to an impression value space. As a result, an adequate number of music fall within the range of impression words "pop" and "healing" equally.

Thus, the music retrieval apparatus 100 may include the impression value modification unit 112 which modifies a distribution range of impression values, as shown in FIG. 8, instead of the range modification unit 109 which modifies an impression word range.

Thus, in performing a retrieval using an impression word, it is possible to produce the appropriate narrowing-down effect by modifying impression values instead of impression word range according to the distribution of impression values.

Note that the music retrieval apparatus 100 may include both of the range modification unit 109 and the impression value modification unit 112 rather than including the impression value modification unit 112 instead of the range modification unit 109.

In such a case, in the case where the number of pieces of music regarded as search targets is numerous and few impression words are set in an impression word conversion table, for example, the range modification unit 109 may modify an impression word range. In the reverse case where the number of pieces of music regarded as search targets is few and numerous impression words are set in an impression word conversion table, the impression value modification unit 112 may modify the impression words.

Moreover, both of impression values and impression word range may be modified. In this case, a reference two-dimensional space which serves as a reference and has a predetermined size, for example, is determined. Furthermore, the impression value is modified through linear mapping so that its distribution range has the same size as the size of the reference two-dimensional space. Alternatively, a search word range is modified through linear mapping from an impression word space to a reference two-dimensional space. Thus, a relative relationship between the distribution range of impression values and the search word range becomes as same as the relationship in the impression space shown in the right of FIG. 10.

In other words, even in the case of modifying both impression values and search word range, it is possible to appropriately narrow down the range of search target.

In this way, in the case of modifying, with the music retrieval apparatus 100, a relative relationship between a distribution range of impression values and a search word range, one of impression values and search word range may be modified, or the both may be modified. Thus, it is possible, for example, to select a modification method with less processing load according to the number of pieces of music regarded as search targets and the number of impression words that are set in an impression word conversion table.

Alternatively, plural types of impression word conversion tables may be prepared in advance, and the range modification unit 109 may select an impression word conversion table for use in retrieval may be selected according to the characteristics of a group of the music regarded as search targets.

For example, the conversion table storage unit 108 stores artist-classified impression word conversion tables that are in accordance with a distribution of the impression values of a group of music classified on an artist basis. In the case where a group of music regarded as search targets is a group of music obtained as a result of conducting a search using a specific artist, the range modification unit 109 selects the impression word conversion table associated with the artist. After that, retrieval is performed using the selected impression word conversion table.

In other words, plural impression word ranges are set in advance for the selected impression word conversion table, in accordance with the distribution of the impression values of respective search target music. Therefore, previously preparing the artist-classified impression word conversion tables has the same effect as can be achieved by modifying an impression word range according to the distribution of impression values of respective search target music. In short, it is possible to appropriately narrow down the range of search target even in the case where the distribution of impression values of the respective pieces of music regarded as search targets is uneven.

Note that the range modification unit 109 may obtain an artist's name stored as music information in the music information database 103, as well as an impression value of the artist's music, which is stored in the impression value database 104, and create such an artist-classified impression word conversion table in advance.

Alternatively, music-genre-classified impression word conversion tables may be prepared beforehand instead of artist-classified impression word conversion tables. It is conceived that the impression values of music depend on music genre, in many cases. Therefore, both of the artist-classified impression word conversion tables and the genre-classified impression word conversion tables shall be prepared. In the case where search targets are a group of music obtained as a result of conducting a search using a specific genre, the range modification unit 109 selects the impression word conversion table associated with the genre. After that, retrieval using the selected impression word conversion table is performed.

By previously preparing genre-classified impression word conversion tables, it is possible to appropriately narrow down the range of search target even in the case where the distribution of impression values of the respective pieces of music regarded as search targets is uneven.

Note that the range modification unit 109, for example, may obtain a genre stored in the music information database 103 and an impression value of the music which belongs to the genre and is stored in the impression value database 104, and create such a genre-classified impression value conversion table.

In this way, by previously preparing an artist-classified or a genre-classified impression conversion table, the range modification unit 109 does not need to perform calculation for modifying an impression word range in the case where the search targets are a group of music obtained as a result of conducting a search based on a specific artist's name or genre. In other words, it is possible to reduce the load related to the processes performed during the search.

Note that the artist's name and genre described above are the examples of the attribute values for grouping multiple pieces of music, and the name of a label to which music belongs or a year in which music is released may be used as such attributes. For example, a label-classified impression word conversion table may be prepared beforehand. In the case where a search target is a group of music obtained as a result of conducting a search using a specific label name, a search may be conducted using such a label-classified impression word conversion table.

It is described that the range modification unit 109 modifies the size and the position of the impression word range using the equations (Equation 2) and (Equation 3) described above. However, only the size may be modified. For example, the impression word range that is set in the impression word conversion table of the present embodiment is represented in the form of a circle. In such a case, instead of modifying the position of the center of the circle, only the length of the radius may be modified.

Figure 11:
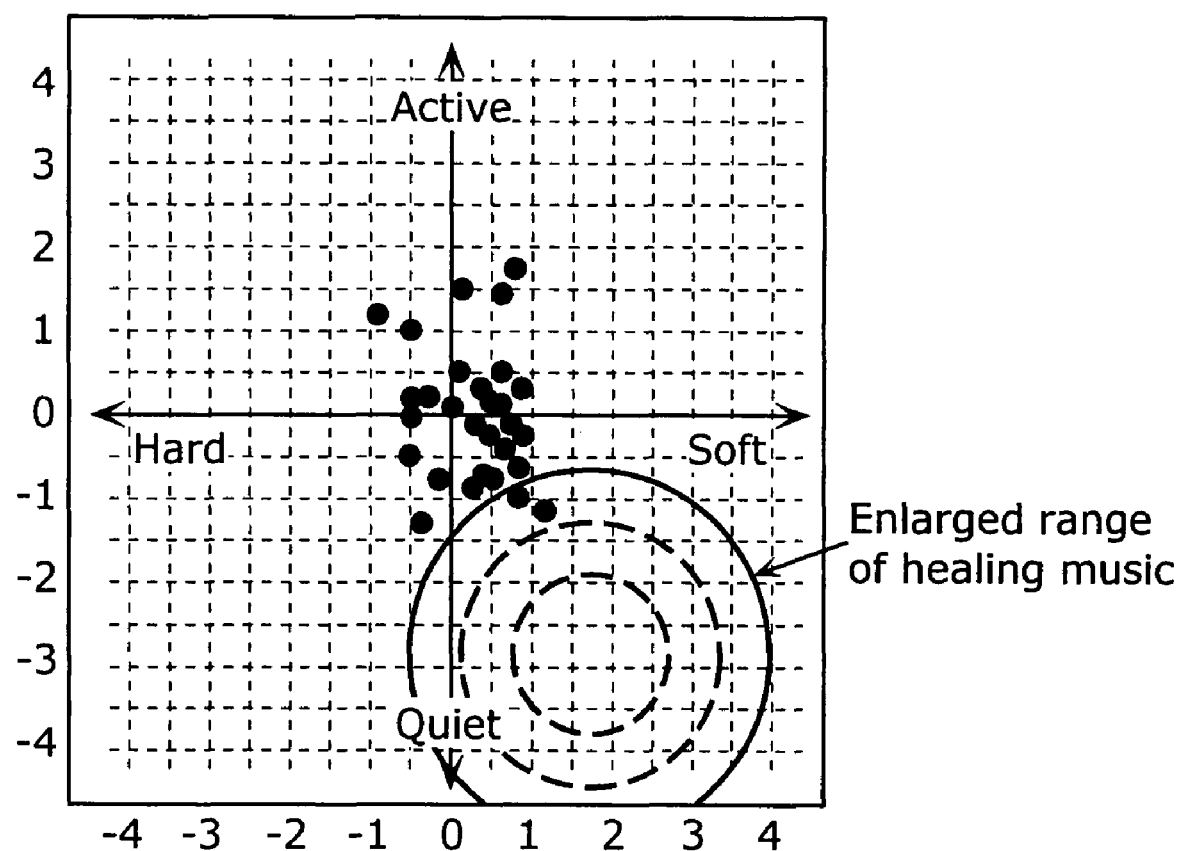
FIG. 11 is a conceptual diagram showing an example in the case of modifying only a radius of the impression word range in the impression space.

FIG. 11 is a conceptual diagram showing an example in the case where only a radius of the impression word range within an impression space is modified.

In the case where the number of impression vales included in the impression word range for the impression word "heal-ing" that is set in the impression word conversion table is 0, as shown in FIG. 11, the size of the impression word range is enlarged until a predetermined or larger number of impression values are included in the impression word range. For instance, the size of the impression word range is enlarged until three impression values are included. In this case, at least three impression values which are the closest to the center of the impression word range are to be selected. Thus, it is possible to appropriately narrow down the range of the search target even in the case of enlarging the size of the impression word range, as needed, without modifying the position of the center of the impression word range.

Moreover, in the case where the number of impression values included in the impression word range that is set in the impression word conversion table is numerous, the range modification unit 109 may reduce the size of the impression word range until the number of impression values included in the impression word range is a predetermined number or below. For instance, in the case where six or more impression values are included in the impression word range, the size of the impression word range may be reduced until the number becomes 5 or below.

In the above case, five impression values, at maximum, which are the closest to the center of the impression word range are to be selected. Thus, it is possible to appropriately narrow down the range of the search target even in the case of reducing the size of the impression word range, as needed, without modifying the position of the center of the impression word range.

Moreover, instead of enlarging/reducing the size of the impression word range by simply modifying the length of the radius, the enlargement/reduction may be performed after modifying the form of the impression word range into the form of an ellipse in accordance with the distribution of impression values.

For example, in the case where the distribution range of impression values is in a vertically-long shape in the Y-axis direction, as shown in FIG. 11, the size of the impression word range may be enlarged/reduced after having modified the shape of the impression word range from a circle to an ellipse that is created by extending only the radius in the Y-axis direction. Alternatively, the size modification can be performed after changing a ratio between the length of the radius in the Y-axis direction and the length of the radius in the X-axis direction of the impression word range to become equal to a ratio between the length of the radius in the Y-axis direction and the length of the radius in the X-axis direction of the distribution range of impression values.

By thus doing, it is possible to narrow down the range of search targets upon taking the way two types of impression values extend in the respective axis directions.

Moreover, the functions for enlarging or reducing the size of an impression word range may be added to the mode of modifying the size of an impression word range using the equations (Equation 2) and (Equation 3) described above. Alternatively, the same functions may be added to the mode of modifying impression values using the equations (Equation 5) and (Equation 6) described above.

The embodiment described above defines that an impression space is two-dimensional. However, the impression space may be one-, three- or more than three-dimensional. For example, in the case where each piece of music is associated with a new impression value made up of three kinds of impression values, an equation representing an impression word range stored in an impression word conversion table may be changed into an equation representing a closed range within the impression space. In addition, the range modification unit 109 or the impression value modification unit 112 may modify an impression word range or an impression value in accordance with the distribution of impression values in a three-dimensional impression space, using mapping function or inverse mapping function.

In the embodiment, search words are defined to be impression words such as "uptempo", "pop", "healing" and the like which express music at intuitive level. However, other types of ambiguous words (hereinafter referred to as "ambiguous words") may be used as the search words.

For example, the ambiguous words such as "recent" and "old time" that represent an attribute of music, e.g., decade, era, period or the like, in which music is released may be used.

It is possible to replace the ambiguous words such as "recent" and "old-time" by an attribute value indicating decade, era, period or the like, in which music is released. However, absolute decades associated with such ambiguous words differ according to the distribution range on a time axis for a group of music regarded as search targets. Note that an attribute value indicating decade, era, period or the like, in which music is released is referred to as "chronological value".

Here, the case of using, as search words, such ambiguous words indicating decade as described above, in retrieving music data, is assumed. Assuming that the range specified by an ambiguous word on a time axis is fixed under such assumption, it is not possible to appropriately narrow down the range of search targets in the case where the distribution of chronological values of a group of music regarded as the search target is uneven.

However, the music retrieval apparatus 100 according to the embodiment of the present invention can be applied to the mode of retrieving music data using such an ambiguous word as a search word, and also, it is possible to appropriately narrow down the range of search targets. Note that, in such a case, an attribute value to be associated with respective pieces of music is one type, that is, a chronological value indicating a decade in which music is released, and the space in which the chronological values are distributed is one-dimensional. Hereinafter, a one-dimensional space is referred to as "chronological space". That is to say that the range of chronological values associated with an ambiguous word within such a chronological space becomes a search word range.

Figure 12:
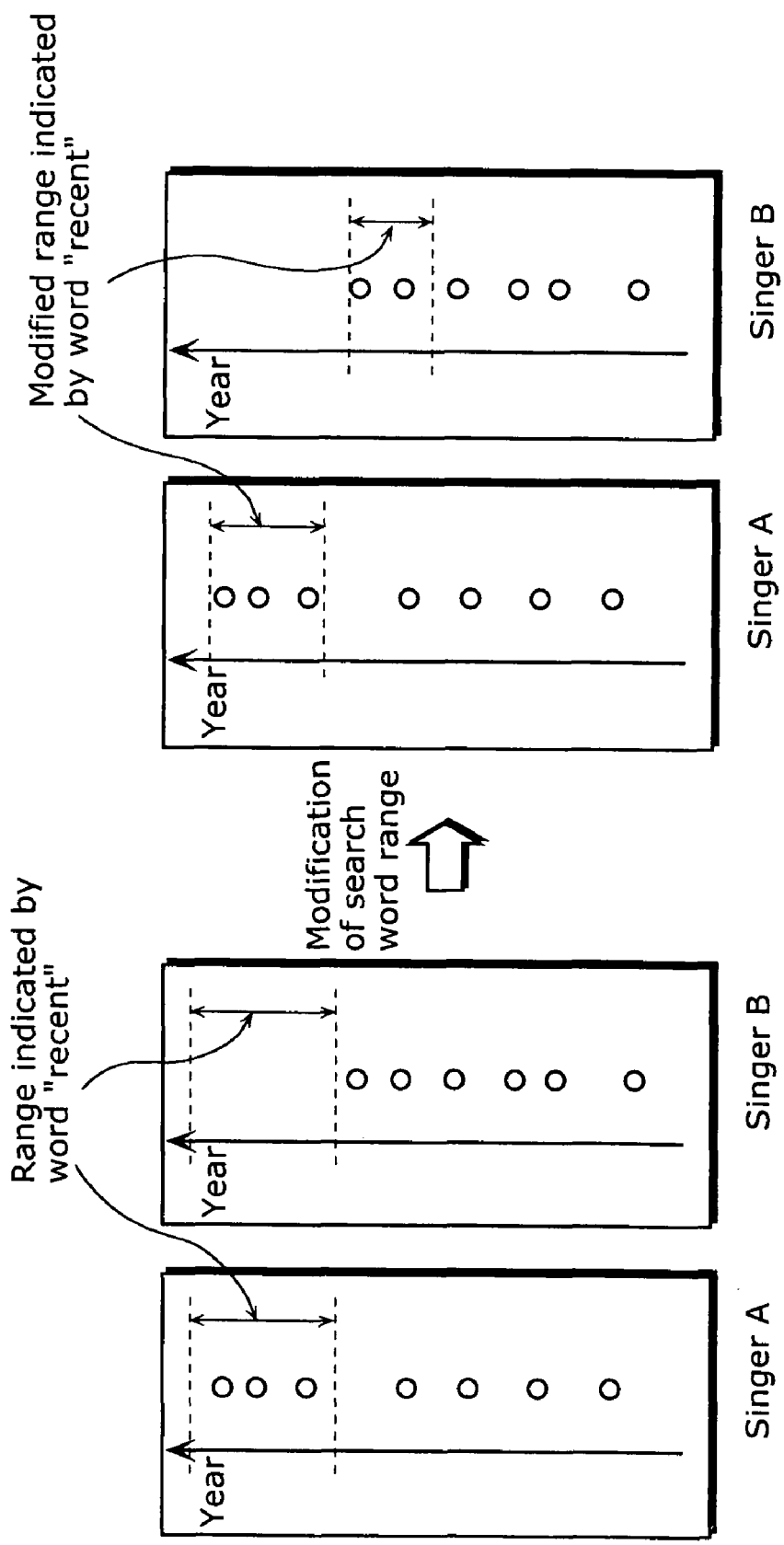
FIG. 12 is a conceptual diagram showing a chronological space indicating a difference between search results obtained in the case of retrieving music data using ambiguous words related to chronology within a specific search word range, and search results obtained within the search word range which has been modified according to the distribution of chronological values.

FIG. 12 is a conceptual diagram of a chronological space indicating a difference between the search results obtained using a predetermined search word range in the case of searching music data with an ambiguous word related to decades, and the search results obtained using the search word range modified according to the distribution of chronological values.

The left of FIG. 12 shows the search results obtained using a predetermined search word range while the right of FIG. 7 shows the search results using the search word range modified according to the distribution of chronological values. In other words, the left of FIG. 12 shows the search results obtained in the case of applying the conventional music retrieval system to the retrieval using ambiguous words. It is also assumed that the search target is the respective groups of music performed by a singer A and a singer B.

The chronological space has a predetermined size, e.g., a period between 1990 and 2005.

In the left in FIG. 12, although the distributions of chronological values are different between the singer A and the singer B, the search word range of the ambiguous word "recent" is the same. In other words, with the conventional technology, a search range is fixed by a predetermined period based, for example, on the present time or a predetermined period of years or months. As a result, three pieces of music are retrieved with regard to the singer A while no music is retrieved with regard to the singer B.

However, as shown in the right of FIG. 12, with the music retrieval system 100 according to the embodiment of the present invention, it is possible to modify a search word range according to the distribution of chronological values within a chronological space. It is therefore possible to output, as search results, adequate numbers of music with regard to both of the singers A and B.

In this case, the conversion table storage unit 108 is made to store in advance the search word conversion table associated with an ambiguous word indicating a decade or the like and a range of chronological values. For example, information indicating a period from six months ago to the present is previously associated with the ambiguous word "recent".

Also, instead of or in addition to the impression value database 104, a chronological value database may be set in the music data storage unit 105, and the chronological values of respective pieces of music are previously stored in association with music IDs.

Moreover, the range modification unit 109 modifies a search word range according to the distribution of chronological values in a chronological space for the pieces of music regarded as search targets. For example, the search word range of the ambiguous word "recent" is modified through linear mapping from a chronological space to a distribution range of chronological values.

Thus, with the music retrieval apparatus 100, it is possible to appropriately narrow down the range of search targets even in the case where the distribution of chronological values of a group of music regarded as search targets is uneven.

Note that by modifying a chronological value rather than a search word range, as is the case of the mode of retrieving music data using impression words, the effect of appropriately narrowing down the search targets can be achieved even a relative relationship between a distribution range of chronological values and a search word range is modified.

The music retrieval apparatus 100 which searches music data is described as the embodiment of the present invention, however, the data to be searched may be content data other than music data.

For example, video data or still image data may be searched instead. For instance, in the case of setting video data as search targets, at least impression values of the video may be compiled as a database. The function of modifying an impression word range or a distribution range of attribute values such as impression values, which is the feature of the present invention, may never be lost whatever type of data a search target may be.

In other words, providing that the content data set as search targets can be associated with an attribute value indicating a content attribute, such as an impression value, it is possible to conduct a search using a word indicating an attribute of an impression word or the like, and also, to appropriately narrow down the range of the search targets by modifying the size of an impression word range as described above.

In the embodiment, an impression word to be used as a search word may be an impression word other than those shown in FIG. 4, and may only need to be associated with an equation indicating an impression word range, or the like. Also, the user does not have to select an impression word from those shown in FIG. 4. In this case, the impression word range associated with the impression word selected by the user need to be identified in an impression word conversion table.

Moreover, in the impression word conversion table, an impression word may be associated with an impression value represented by a dot. For example, the impression word range for the impression word "pop" may be defined as (X,Y)=(0.4, −0.2). In other words, the impression word range may be information indicating such a dot. In such a case, the music having an impression value, representing a dot, which falls within the impression word range can be outputted as search results.

Moreover, the impression word range, which is a range of an impression value associated with an impression word, may not be such a mathematical expression as shown in FIG. 4. For example, the impression word range may be information indicating the center and radius of a circle for specifying the search word range. Also, the information indicating the modified impression word range, which is passed from the conversion unit 110 to the retrieval unit 111, may not be a mathematical expression per se, and may be information indicating a focal point and a ratio between vertical radius and horizontal radius of an ellipse. Thus, the information indicating a search word range does not need to be a mathematical expression, and only need to be information that can uniquely identify a range in an impression space.

It is also described that the range modification unit 109 and the impression value modification unit 112 perform linear mapping conversion in modifying an impression word range or an impression value. However, the conversion may not be linear, and may be non-linear instead. Plural linear and non-linear functions may be selectively used according to the distribution of impression values.

In other words, for modifying an impression word range, the size of an impression word range may be reduced and moved so that at least the impression word range is included in a distribution range of impression values. In the case of modifying impression values, the impression values may be modified so that at least the size of the distribution range of impression values is enlarged. In either case, the relative relationship between the distribution range of impression values and the impression word range can be modified in such a way that the effect of narrowing down the number of search targets through a search is produced.

The order and the details of the processes related to the retrieval performed by the music retrieval apparatus 100 may not be the same as those shown in the flowchart in FIG. 9.

For example, in the flowchart shown in FIG. 6, an impression word specified by the user may be first received (S207), and then, an impression word may be obtained (S204). In this case, the range modification unit 109 may read out only the mathematical expression indicating the search word range of the search word received by the receiving unit 107 and then modify the expression, for example.

In other words, the order and the details of the processes related to the retrieval executed by the music retrieval apparatus 100 shall not be limited to those described in the embodiment. At least, a relative relationship between a distribution range of impression values and an impression word range shall be modified according to the distribution of the impression values of a group of music regarded as search targets, and retrieval of music data using the search word specified by the user shall be enabled. Accordingly, the order of the processes related to the retrieval execution may be determined based on user's needs, an actual value of processing speed and the like.

It is also described that a music ID is used as an identifier for identifying music, however, information which can identify music and associate music data, music information and an impression value, such as a name of music and a music number may be used.

It is described that the music data storage unit 105 equipped in the music retrieval apparatus 100 is configured of three databases of the music database 102, the music information database 103 and the impression value database 104. However, the music data storage unit 105 may only need to store respective music data, music information and an impression value in association with one another, and may also be configured of one database.

Also, in the embodiment, the impression values of the respective pieces of music calculated by the impression value calculation unit 106 are stored in the impression value database 104, and then a search is conducted. However, the impression values stored in the impression value database 104 may be calculated in advance. For example, the impression value database 104 may be generated by causing the music retrieval apparatus 100 to read necessary impression values from a storage medium in which the impression values of the respective pieces of music are stored.

The music data and music information may be stored in an external database. At least with the database in which an impression value and a music ID are stored in association with each other, it is possible to identify the music searched out.

The search results storage unit 101 is defined to store information related to the search results obtained in the music retrieval apparatus 100. However, information regarding the results searched out by another retrieval apparatus or the like, e.g., music IDs of respective pieces of music searched out, may be stored. In other words, the music retrieval apparatus 100 is capable of further narrowing down the range of the search targets, the number of which has already been narrowed down by another retrieval apparatus.

In the embodiment, it is described that the output unit 120 outputs the searched-out music IDs, music data and the like to the user. However, a different apparatus may be caused to display and reproduce such music IDs, music data and the like to the user.

Also, the music retrieval apparatus 100 may be incorporated into a network distribution system for distributing music data via a network such as the Internet, and may be used in music data retrieval. The music retrieval apparatus 100 is capable of appropriately narrowing down the range of search targets, as described above. For this reason, the music retrieval apparatus 100 is suitable for the network distribution system in which the music data desired by the user needs to be effectively searched out from a large amount of music data.

Also, methods of presenting the search results to the user may include generating a play list in which the music IDs of the searched-out music data and the titles of the music included in the music information are listed.

The methods of outputting search results to the user may be designed according to user's requests, manufacturing cost, and the like.

INDUSTRIAL APPLICABILITY

As described above, the content data retrieval apparatus of the present invention is capable of modifying a relative relationship between a distribution range of attribute values of contents and a search word range according to the distribution of the attribute values of the contents. Therefore, it is possible to appropriately narrow down the range of search targets even in the case where the distribution of the attribute values of the contents regarded as the search target is uneven.

For example, in the case of applying music data as content data and using an impression word as a search word, by modifying an impression word range or an impression value of each of the pieces of music regarded as search targets, it is possible to present the user with an adequate number of music searched out, even in the case where whatever impression word may be selected in the subsequent music retrieval using an impression word. In other words, even in the case where an impression word placed in a relative position with respect to the respective pieces of music regarded as search targets is specified as a search word in a user's mind, it is possible to output the search results which reflect the user's intention in specifying that impression word. Therefore, the content data retrieval apparatus of the present invention is useful as an apparatus which narrows down the number of music through a search by an audio device, audio function equipped car navigation, a mobile music player, a PC music playback application, or the like.

The invention claimed is:

1. A content data retrieval apparatus which retrieves content data associated with one or more attribute values, said apparatus comprising:
    an attribute value storage unit configured to store the one or more attribute values, the one or more attribute values each indicating a content attribute, and the one or more attribute values being distributed in an attribute value space having a predetermined size;
    a receiving unit configured to receive a search word as an input;
    a conversion table in which the search word is associated with a search word range, the search word range having a range of the one or more attribute values associated with the search word, the range of the one or more attribute values having a distribution of the range of the one or more attribute values, the search word range having a relative relationship between the search word range and the distribution of the range of the one or more attribute values, and the search word range being a two- or more than two-dimensional space range; and
    a processor including
        a modification unit configured to modify the relative relationship between the search word range and the distribution of the range of the one or more attribute values by modifying the range of the one or more attribute values or by modifying the search word range in accordance with the distribution of the range of the one or more attribute values stored in said attribute value storage unit, wherein said modification unit is further configured to modify the search word range by reducing a size of the search word range such that a ratio in size of the distribution of the range of the one or more attribute values to an entirety of the attribute value space becomes equal to a ratio in the size of the search word range to the distribution of the range of the one or more attribute values, and by moving the reduced size search word range such that the reduced size search word range is included in the distribution of the range of the one or more attribute values, and
        a retrieval unit configured to retrieve the content data corresponding to the search word by searching the range of the one or more attribute values associated with the search word range in the relative relationship between the search word range and the distribution of the range of the one or more attribute values modified by said modification unit, the search word range being associated with the search word received by said receiving unit and being modified by said modification unit.

2. The content data retrieval apparatus according to claim 1,
    wherein the search word range is located within the attribute value space, and
    wherein said modification unit is further configured to modify the search word range by converting the search word range through linear mapping from the attribute value space to the distribution of the range of the one or more attribute values.

3. The content data retrieval apparatus according to claim 1,
    wherein said modification unit is further configured to modify the one or more attribute values so that the distribution of the range of the one or more attribute values is enlarged, and
    said retrieval unit is configured to retrieve the content data corresponding to the search word by searching the attribute values which are included in the search word range and are modified by said modification unit, the search word range being associated with the search word received by said receiving unit, and being modified by said modification unit.

4. The content data retrieval apparatus according to claim 3,
    wherein the search word range is located within the attribute value space, and
    wherein said modification unit is further configured to modify the attribute values by converting the attribute values through linear mapping from the distribution of the range of the one or more attribute values.

5. The content data retrieval apparatus according to claim 1,
    wherein when the number of the one or more attribute values included in the search word range is less than a predetermined number, said modification unit is further configured to modify the search word range by enlarging the search word range so that the number of one or more attribute values included in the search word range is the predetermined number or above.

6. The content data retrieval apparatus according to claim 5,
    wherein the search word range is located within the attribute value space, and
    wherein said modification unit is further configured to
    determine a ratio between a respective dimension lengths of the search word range within the attribute value space according to a ratio between a respective dimension lengths within the attribute value space of the distribution of the range of one or more attribute values, and
    modify the search word range by enlarging the size of the search word range such that the number of the one or more attribute values included in the search word range is a predetermined number or above, while keeping the determined ratio of lengths.

7. The content data retrieval apparatus according to claim 1,
    wherein when the number of the one or more attribute values included in the search word range exceeds a predetermined number, said modification unit is further configured to modify the search word range by reducing the size of the search word range so that the number of the one or more attribute values included in the search word range is the predetermined number or below.

8. The content data retrieval apparatus according to claim 7,
wherein the search word range is located within the attribute value space, and
wherein said modification unit is configured to
determine a ratio between a respective dimension lengths of the search word range according to a ratio between a respective dimension lengths within the attribute value space of the distribution of the range of the one or more attribute values, and
modify the search word range by reducing the size of the search word range such that the number of the one or more attribute values included in the search word range is a predetermined number or below, while keeping the determined ratio of lengths.

9. The content data retrieval apparatus according to claim 1,
wherein the one or more attribute values are each an impression value which, the impression value being an index value representing an impression on the content.

10. A method executed by a processor for retrieving content data associated with one or more attribute values, said method comprising:
storing the one or more attribute values in an attribute value storage unit, the one or more attribute values each indicating a content attribute, and the one or more attribute values being distributed in an attribute value space having a predetermined size;
receiving a search word from an input;
associating the search word with a search word range, the search word range having a range of the one or more attribute values associated with the search word, the range of the one or more attribute values having a distribution of the range of the one or more attribute values, the search word range having a relative relationship between the search word range and the distribution of the range of the one or more attribute values, and the search word range being a two- or more than two-dimensional space range;
using the processor to modify the relative relationship between the search word range and the distribution of the range of the one or more attribute values by modifying the range of the one or more attribute values or by modifying the search word range in accordance with the distribution of the range of the one or more attribute values stored in the attribute value storage unit, wherein, in said modifying, the search word range is modified by reducing a size of the search word range such that a ratio in size of the distribution of the range of the one or more attribute values to an entirety of the attribute value space becomes equal to a ratio in the size of the search word range to the distribution of the range of the one or more attribute values, and by moving the reduced size search word range such that the reduced size search word range is included in the distribution of the range of the one or more attribute values; and
retrieving the content data corresponding to the search word by searching the range of one or more attribute values associated with the search word range in the relative relationship between the search word range and the distribution of the range of the one or more attribute values modified in said modifying, the search word range being associated with the search word received in said receiving and being modified in said modifying.

11. A program recorded on a computer readable storage medium that when executed causes a computer to retrieve content data associated with one or more attribute values, said program causing the computer to perform a method comprising:
storing the one or more attribute values in an attribute value storage unit, the one or more attribute values each indicating a content attribute, and the one or more attribute values being distributed in an attribute value space having a predetermined size;
receiving a search word from an input;
associating the search word with a search word range, the search word range having a range of the one or more attribute values associated with the search word, the range of the one or more attribute values having a distribution of the range of the one or more attribute values, the search word range having a relative relationship between the search word range and the distribution of the range of the one or more attribute values, and the search word range being a two- or more than two-dimensional space range;
using the computer to modify the relative relationship between the search word range and the distribution of the range of the one or more attribute values by modifying the range of the one or more attribute values or by modifying the search word range in accordance with the distribution of the range of the one or more attribute values stored in the attribute value storage unit, wherein, in said modifying, the search word range is modified by reducing a size of the search word range such that a ratio in size of the distribution of the range of the one or more attribute values to an entirety of the attribute value space becomes equal to a ratio in the size of the search word range to the distribution of the range of the one or more attribute values, and by moving the reduced size search word range such that the reduced size search word range is included in the distribution of the range of the one or more attribute values; and
retrieving the content data corresponding to the search word by searching the range of one or more attribute values associated with the search word range in the relative relationship between the search word range and the distribution of the range of the one or more attribute values modified in said modifying, the search word range being associated with the search word received in said receiving and being modified in said modifying.

12. A processor comprising an integrated circuit for retrieving content data associated with one or more attribute values,
said integrated circuit comprising:
an attribute value storage unit configured to store the one or more attribute values, the one or more attribute values each indicating a content attribute, and the one or more attribute values being distributed in an attribute value space having a predetermined size;
a modification unit, having a processor, said modification unit being configured to modify a relative relationship between a search word range and a distribution of a range of the one or more attribute values by modifying the range of the one or more attribute values or by modifying the search word range in accordance with the distribution of the range of the one or more attribute values stored in said attribute value storage unit, the search word range being a two- or more than two-dimensional space range, wherein said modification unit is further configured to modify the search word range by reducing a size of the search word range such that a ratio in size of the distribution of the range of the one or more attribute values to an entirety of the attribute value space becomes equal to a ratio in the size of the search word range to the distribution of the range of the one or more attribute values, and by moving the reduced size search word range such that the reduced size search word range is included in the distribution of the range of the one or more attribute values;

a receiving unit configured to receive the search word as input; and a retrieval unit configured to retrieve the content data corresponding to the search word by searching the range of the one or more attribute values associated with the search word range in the relative relationship between the search word range and the distribution of the range of the one or more attribute values modified by said modification unit, the search word range being associated with the search word received by said receiving unit and being modified by said modification unit.

* * * * *